United States Patent [19]
Becker

[11] Patent Number: 5,490,381
[45] Date of Patent: Feb. 13, 1996

[54] NEED-BASED METHOD OF HEATING A CATALYST IN THE EXHAUST SYSTEM OF AN INTERNAL COMBUSTION ENGINE

[75] Inventor: Ruediger Becker, Murr, Germany

[73] Assignee: Robert Bosch GmbH, Stuttgart, Germany

[21] Appl. No.: 271,928

[22] Filed: Jul. 7, 1994

[30] Foreign Application Priority Data

Jul. 12, 1993 [DE] Germany .................... 43 23 243.4

[51] Int. Cl.[6] .................................................. F01N 3/20
[52] U.S. Cl. ......................... 60/274; 60/276; 60/277; 60/284; 60/285; 60/289; 60/300
[58] Field of Search ........................... 60/274, 276, 277, 60/284, 286, 289, 300, 285

[56] References Cited

U.S. PATENT DOCUMENTS

| | | | |
|---|---|---|---|
| 4,165,610 | 8/1979 | Iizuka et al. ...................... | 60/284 |
| 4,622,809 | 11/1986 | Abthoff et al. ..................... | 60/274 |
| 5,191,763 | 3/1993 | Yuuki ................................. | 60/300 |
| 5,216,880 | 6/1993 | Aoki .................................. | 60/300 |
| 5,303,548 | 4/1994 | Shimuzu ............................ | 60/277 |

*Primary Examiner*—Douglas Hart
*Attorney, Agent, or Firm*—Kenyon & Kenyon

[57] ABSTRACT

A need-based method of heating a catalyst in the exhaust-gas system of an internal combustion engine, in which a converting power of the catalyst is determined and the catalyst is heated as a function of the converting power. Depending on the operating conditions of the internal combustion engine, different measures are undertaken for the heating of the catalyst. If the heating measures do not lead to the desired results within a predetermined time interval, a diagnostic function is started. As part of the diagnostic function, particularly effective heating measures are applied. If while using these measures a sufficient converting power of the catalyst is not obtained within a predetermined second time interval, it is assumed that the catalyst is damaged.

12 Claims, 3 Drawing Sheets

NEED-BASED METHOD OF HEATING A CATALYST IN THE EXHAUST SYSTEM OF AN INTERNAL COMBUSTION ENGINE

FIELD OF THE INVENTION

The present invention relates to a need-based method and apparatus for heating a catalyst in the exhaust system of an internal combustion engine.

BACKGROUND OF THE INVENTION

As is known, a catalyst becomes effective only above a minimum operating temperature. Below this minimum operating temperature, the catalyst is not able to convert the noxious substances contained in the exhaust gas of an internal combustion engine into less noxious substances. For the smallest possible emission of pollutants, the catalyst should be ready for operation during the entire time during which pollutants are present, i.e., during the entire time between the starting and stopping of the internal combustion engine. Since heating of the catalyst is effected by the exhaust gases of the internal combustion engine—and possibly also, for instance, by additional electric heating—the catalyst is necessarily below the minimum operating temperature upon starting of the internal combustion engine and, in part also, under certain operating conditions of the internal combustion engine, such as long-continued coasting. In order to achieve the highest possible availability of the catalyst, it is thus advisable to heat the catalyst. There are certain problems, however, associated with heating the catalyst, and in particular excessively high temperatures can result in damage to the catalyst, and heating causes an additional consumption of energy or an increased emission of pollutants, reduced driving comfort, and reduced power.

An apparatus for heating a catalyst in the exhaust system of an internal combustion engine is described in U.S. Pat. No. 4,165,610 to Iizuka et. al. (the "Iizuka patent"). In that apparatus, fuel is injected into the engine via an additional injection nozzle when the temperature of the catalyst drops below the minimum operating temperature. It is stated in the Iizuka patent that upon a cold start or as a result of stalling in the lower load range, the temperature of the catalyst could be below the minimum operating temperature.

U.S. Pat. No. 4,622,809 to Abthoff et. al. describes how the cracking property of a catalyst can be determined from the amplitude of the output signal of an oxygen sensor which is arranged downstream of the catalyst.

SUMMARY OF THE INVENTION

An object of the present invention is to obtain optimal heating of the catalyst in a method and an apparatus of the aforementioned type. In the present invention, heating measures are commenced only when they are actually required, that is, when the catalyst is not ready for operation. The method of the present invention thus avoids the problems with unnecessary heating, i.e., potential damage to the catalyst from excessively high temperatures, the additional consumption of energy or increased emission of pollutants, reduced driving comfort, and reduced power.

The method and apparatus of the present invention have the advantage that heating of the catalyst is based on the need which is actually present. Measures for heating the catalyst are taken only if and when heating of the catalyst is actually needed, i.e., when the converting power of the catalyst is too low.

In principle, the temperature of the catalyst could be used as a criterion of its readiness for operation. Depending on whether this temperature is above or below the minimum operating temperature of the catalyst, it would follow that the catalyst is or is not ready for operation. Over time, however, the minimum operating temperature of the catalyst changes. Thus, a reliable evaluation of the operating condition based on the temperature of the catalyst is made difficult. Furthermore, an exact determination of the temperature of the catalyst is difficult and requires the use of expensive temperature sensors. All of these difficulties are overcome by the present invention, because it does not determine the readiness for operation of the catalyst by the round-about way of determining the temperature of the catalyst but, rather, directly by determining the converting power of the catalyst.

In many methods for determining the catalyst converting power, an oxygen sensor, arranged downstream of the catalyst, is required. The converting power is determined, for instance, from the amplitude and/or frequency of a signal produced by such an oxygen sensor. In view of the fact that exhaust-gas regulations are becoming increasingly stricter, it will not be possible, for some time, to dispense with such an oxygen sensor downstream of the catalyst. As such, including such a downstream sensor in the apparatus of the present invention presents no real disadvantage, at least in the medium to long term. Furthermore, it is also possible to determine the converting power of the catalyst without an oxygen sensor, from the increase in the temperature of the catalyst or exhaust gas that is caused by the conversion. Since heat is produced upon catalytic conversion, the temperature of the exhaust gases and the catalyst increases as a function of the converting power of the catalyst.

The present invention is based on the following principle: the converting power of the catalyst is determined by means of two oxygen sensors, one of which is arranged in front of the catalyst and one behind the catalyst, as seen in the direction of flow of the exhaust gases. Various methods by which the converting power can be determined are known in the prior art. If the converting power determined in this manner is not sufficient, measures are taken for heating the catalyst until a sufficient converting power is reached. If the heating measures do not have the desired result, a diagnostic function is started in order to determine whether the catalyst is damaged. On the other hand, if the catalyst has sufficient converting power, the heating measures are stopped or not even started.

Another advantage of the present invention is that different measures are used for heating the catalyst, depending on the operating condition of the internal combustion engine. Thus, the heating measure which is most favorable for the existing operating condition of the internal combustion engine can be selected, with both the heating action as well as any undesired accompanying phenomena of the heating measure, such as increased emission of pollutants, increased consumption of fuel, reduced power, impairment of driving comfort, etc., being taken into account.

If the heating measures do not lead to a sufficiently high converting power of the catalyst within a predetermined time interval or load integral, a diagnostic function is started by which any possible damage to the catalyst can be noted. In this way, a damaged catalyst is not unnecessarily strongly heated and measures can be taken to limit the damage and to warn the driver.

DETAILED DESCRIPTION OF THE DRAWINGS

Figure 1:
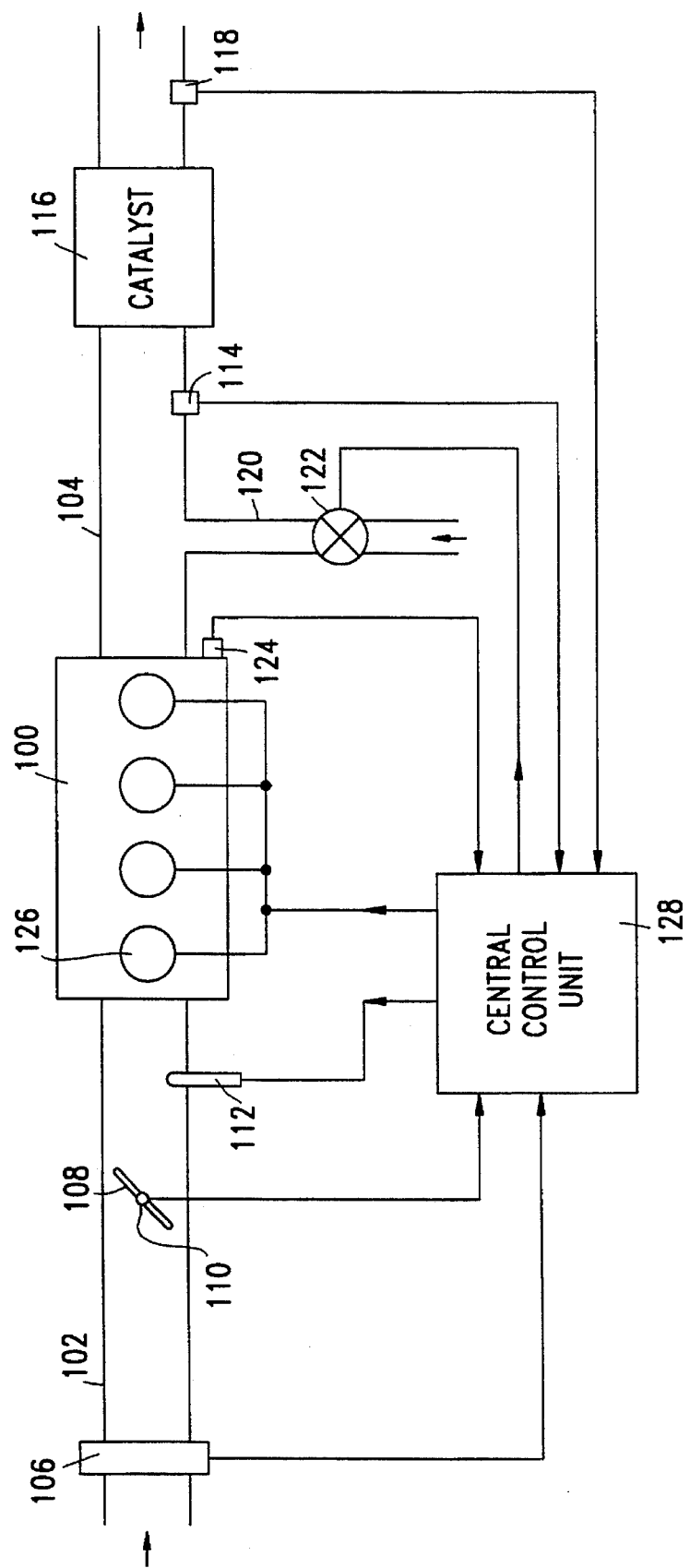
FIG. 1 is a block diagram of an internal combustion engine and various components involved in the present invention.

FIG. 1 is a block diagram of an internal combustion engine 100 and various other components relevant to the description of the present invention. The internal combustion engine 100 is fed an air-fuel mixture via an intake path 102. Exhaust gases from the engine 100 are discharged into an exhaust-gas channel 104. The intake path 102 contains—proceeding in the direction of flow of the intake air—an air-quantity meter or air-weight meter 106, for instance a hot-film air-weight meter, a throttle valve 108 with a sensor 110 for detecting the angle at which the throttle valve 108 is open, and one or more injection nozzles 112. The exhaust-gas channel 104 contains—proceeding in the direction of flow of the exhaust gas—a first oxygen sensor 114, a catalyst 116, and a second oxygen sensor 118. Signals from the first and second oxygen sensors 114 and 118, respectively, are used to determine the converting power of the catalyst 116. Upstream of the first oxygen sensor 114, a secondary-air line 120 emerges from the exhaust-gas channel 104. Fresh air can be blown into the exhaust-gas channel through the secondary air line 120 by means of a secondary air pump 122. A rotational speed sensor 124 is arranged on the internal combustion engine 100. Furthermore, the internal combustion engine 100 has, for instance, four spark plugs 126 for igniting the air/fuel mixture in the cylinders.

Output signals from the air meter 106, the sensor 110 for detecting the opening angle of the throttle valve 108, the first oxygen sensor 114, the second oxygen sensor 118, and the rotational speed sensor 124, are fed to a central control unit 128 via corresponding lines. The control unit 128 evaluates the sensor signals and, via additional connecting lines, controls the injection nozzle or nozzles 112, the secondary air pump 122, and the spark plugs 126.

Figure 2:
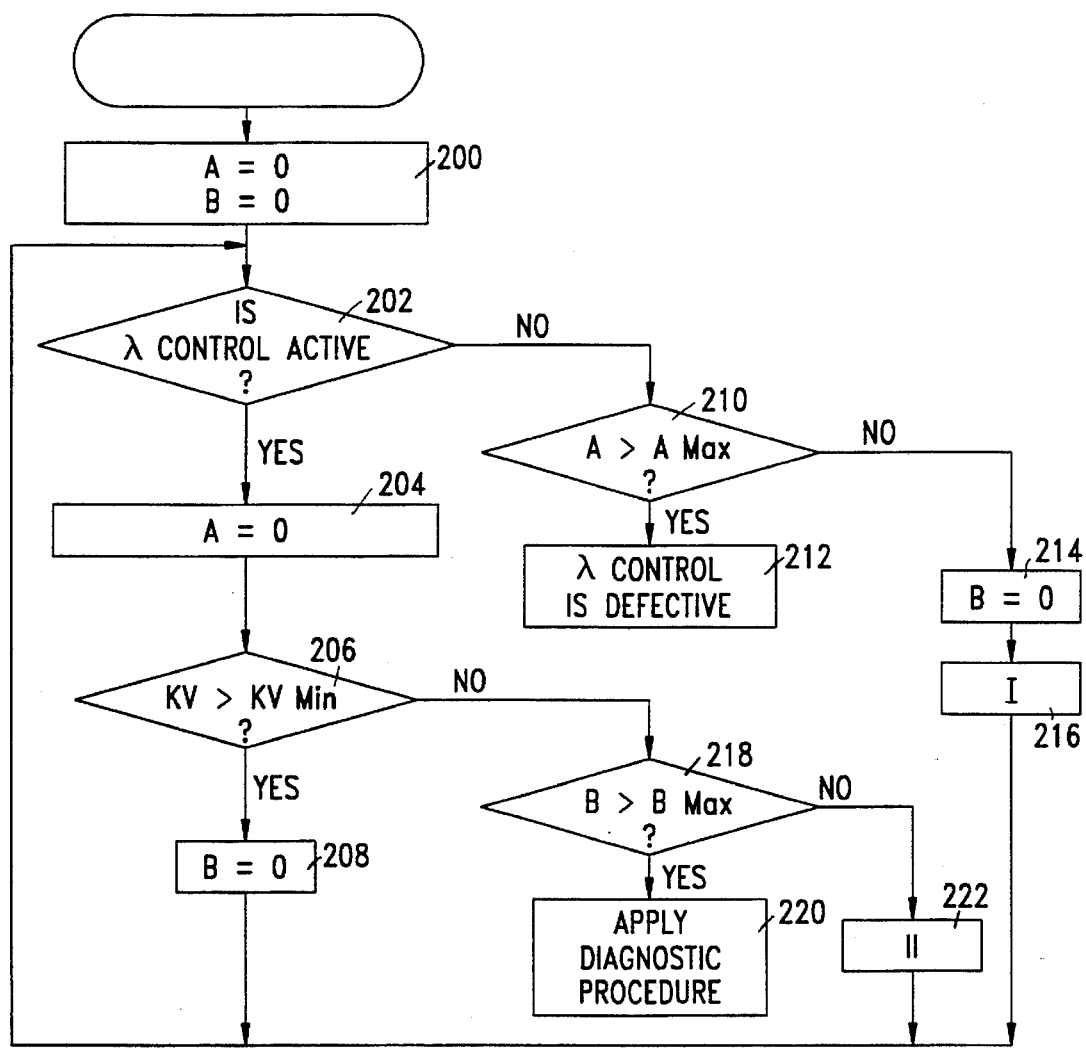
FIG. 2 is a flowchart of the method of the present invention.

FIG. 2 is a flowchart illustrating the method of the present invention. In a first step 200, a timer A and a timer B are set to 0 and started. In a following step 202, it is inquired whether the lambda control of the internal combustion engine 100 is active. If the answer is "yes", operation proceeds to step 204 in which the timer A is set to 0 and started. Step 204 is followed by a step 206 in which it is determined whether the converting power KV of the catalyst 116 is greater than a threshold value KVMin. If so, operation proceeds to step 208 in which the timer B is set to 0 and started. After step 208, operation loops back to step 202.

The above-described branch of the flowchart of FIG. 2 depicts normal operation, in which the lambda control is active and the catalyst 116 has a sufficiently high converting power KV, so that no measures are needed to heat the catalyst 116 or the oxygen sensors 114 and 118.

If the answer to the inquiry at step 202 is "no", however, it is then inquired in step 210 whether the timer A has exceeded a threshold value AMax. If so, it is then concluded in the following step 212 that the lambda control is defective. In step 212, further measures can be taken, such as, for instance, the activation of a warning light in order to advise the driver of the vehicle of the defect, and switching from control operation to regulating operation.

If, however, the answer to the inquiry at step 210 is "no", then operation branches to step 214 in which the timer B is set to 0 and started. Step 214 is then followed by step 216, in which measures are taken to heat the catalyst. Because other measures for heating the catalyst, differing in their nature or sequence from the measures of step 216, are undertaken elsewhere in the flowchart, the heating measures taken at step 216 are designated as heating measures of category I. After step 216, operation loops back to step 202.

The branch of the flowchart from step 202 to step 212 or 216, which has just been described, is the sequence of steps taken after a cold start of the internal combustion engine 100. In the initial phase after a cold start, because the oxygen sensor 114 is still not ready for operation and thus no actual value for a lambda control is available, regulation, instead of control, of the composition of the mixture is effected. A determination of the converting power KV of the catalyst is only possible when the lambda control is active, since the output signals of the oxygen sensors 114 and 118 are used to determine the converting power KV. If the lambda control cannot be activated within a period of time AMax, it is assumed that there is a defect in the lambda control and the method of the present invention ends with step 212, in which the defect is duly indicated and measures possibly taken to limit the damage.

Figure 3:
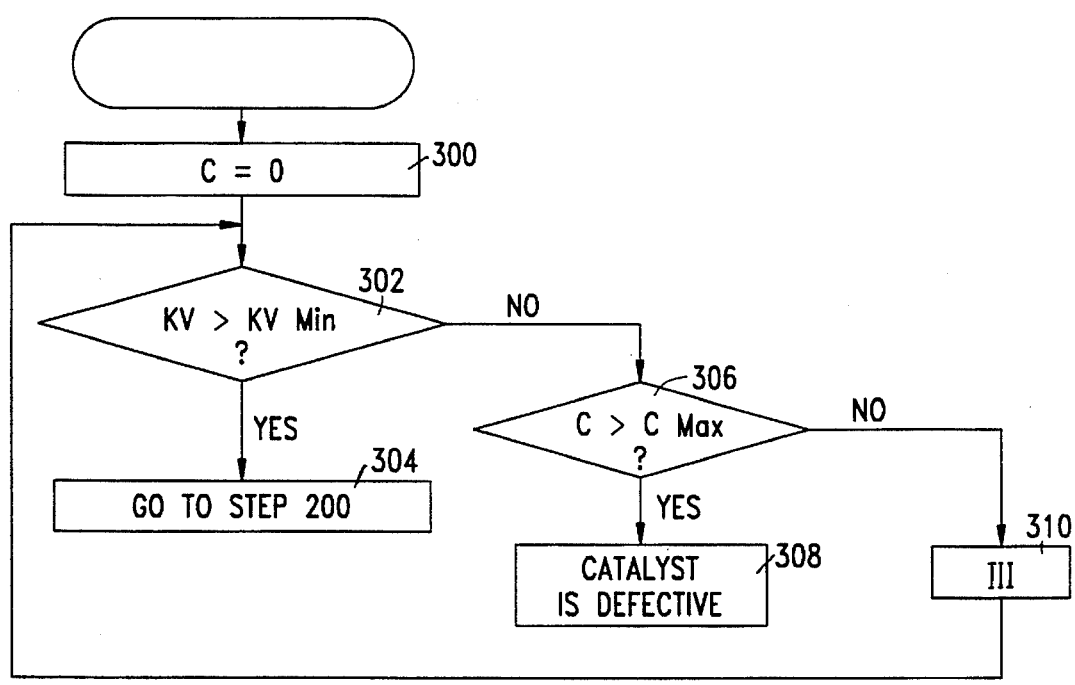
FIG. 3 is a flowchart of a diagnostic procedure, of the method of the present invention, which is activated under certain conditions.

If the answer in step 206 is "no", i.e., the converting power of the catalyst is not above the threshold level, then step 206 is followed by a step 218 in which it is determined whether the timer B has exceeded a threshold value BMax. If so, step 218 is followed by a step 220 in which the procedure for the diagnosis of the catalyst which is shown in the flowchart of FIG. 3 is applied. On the other hand, if the answer in step 218 is "no", operation proceeds to a step 222 in which measures are taken to heat the catalyst. These measures differ in their nature or sequence from the measures of step 216 and are referred to as heating measures of category II. After step 222, operation loops back to step 202.

The above-described path in the flowchart from step 206 to step 220 or 222 can occur, for instance, in the final phase of a cold start or after lengthy coasting or long phases of idling. Since it is determined in step 206 that the converting power KV of the catalyst is too low, heating measures of category II are taken in step 222 until either the converting power KV is sufficient or it is determined in step 218 that the timer B has exceeded the threshold value BMax. The former condition means that the heating measures were successful, while the latter condition means that, despite the heating measures, sufficient converting power KV could not be achieved and that the catalyst should be checked for damage.

FIG. 3 shows a flowchart of a routine for catalyst diagnosis, in accordance with the present invention. In a first step 300, a counter C is set to 0 and started. Step 300 is followed in step 302 by an inquiry as to whether the converting power KV of the catalyst is greater than the threshold value KVMin. If so, it is then concluded in the following step 304 that there is no damage to the catalyst, the diagnosis routine ends, and operation loops back to the flowchart of FIG. 2, beginning with step 200.

If, however, the answer to the inquiry at step 302 is "no", step 306 follows, in which it is determined whether the timer C has exceeded a threshold value CMax. If so, operation proceeds to step 308, in which it is concluded that the catalyst is defective. Furthermore, a warning light is activated in step 308 in order to advise the driver of the defect and a special control strategy can possibly be introduced in order to keep the emission of pollutants as slight as possible despite the defective catalyst. In step 308 the diagnostic routine is terminated.

If it is determined in step 306 that the timer C has not yet exceeded the threshold value CMax, then a step 310 is first carried out. In step 310, measures are introduced—or maintained, if already active—for heating the catalyst. These measures can differ in their nature and sequence from the measures shown in the flowchart of FIG. 2 and are referred to as category III measures. After step 310, operation loops back to step 302.

The measures for heating the catalyst 116 entail an additional consumption of energy, an increased emission of pollutants, an impairment of driving comfort, and/or a reduction in power. These undesired accompanying phenomena occur to different extents in categories I, II, and III. To be sure, the efficiency of the measures for the heating of the catalyst 116, i.e. the heating action, also differs in categories I, II and III.

The object of the category I measures is to heat the catalyst 116 rapidly upon starting of the internal combustion engine. In the category I measures, a retarding of the ignition is first of all effected. In addition, the air/fuel mixture can be so changed as to result in an exothermal after—reaction in the catalyst 116. In this connection, secondary air may be fed. A transmission control, if present, may also be acted upon to increase the average rpm of the internal combustion engine 100. Finally, an increase in the idling speed and a change in the feed of air to the internal combustion engine 100 are also possible.

Category II measures serve to increase the converting power KV of the catalyst 116 in normal operation. The category II measures therefore, in general, are somewhat more moderate than the category I measures. In the case of the category II measures, there is first of all a retardation of the ignition and then, if this is not sufficient, an increase in the idling speed. These measures can be employed to different degrees in different load regions.

The category III measures are particularly far-reaching. However, they are used only in exceptional cases, namely when it is suspected that the catalyst is damaged. In the category III measures, there is an extreme retardation of the ignition and an extreme increase in the idling speed. As a further step, a considerable change in the air/fuel mixture is possible.

In addition to, or instead of, the measures enumerated here for the heating of the catalyst 116, further measures with which a person of ordinary skill in the art would be acquainted can also be used. The decisive fact in this connection is that combinations of measures of different effectiveness are available which can be used as required.

In one advantageous embodiment, integrators over the load of the internal combustion engine 100 are used instead of the timers A, B, and C. In this way, the load-dependent heating of the catalyst can also be included in the method of the present invention. It is also possible to use timers and load integrators jointly.

What is claimed is:

1. A method of heating a catalyst in an exhaust-gas system of an internal combustion engine, the method comprising the steps of:

measuring at least two values, with at least one value representative of a condition before conversion by the catalyst and at least one value representative of a condition after conversion by the catalyst;

determining a converting power of the catalyst from the at least two measured values; and heating the catalyst as a function of the converting power of the catalyst, wherein the heating step includes heating the catalyst using a first set of measures if a lambda control of the internal combustion engine is not active and terminating the first set of measures as a result of the occurrence of an event selected from the group of events consisting of:

an activation of the lambda control, an expiration of a first time interval since a starting of the internal combustion engine, an expiration of the first time interval since a deactivation of the lambda control, a surpassing of a first load integral threshold value by a load integral integrated since the starting of the internal combustion engine, and a surpassing of the first load integral threshold value by a load integral integrated since the deactivation of the lambda control.

2. A method of heating a catalyst in an exhaust-gas system of an internal combustion engine, the method comprising the steps of:

measuring at least two values, with at least one value representative of a condition before conversion by the catalyst and at least one value representative of a condition after conversion by the catalyst;

determining a converting power of the catalyst from the at least two measured values; and heating the catalyst as a function of the converting power of the catalyst, wherein the heating step includes different sets of measures for heating the catalyst depending on at least one operating condition of the internal combustion engine.

3. The method of claim 1, wherein the heating step includes heating the catalyst using a second set of measures if the converting power of the catalyst does not exceed a converting power threshold value, and terminating the second set of measures as a result of the occurrence of an event selected from the group of events consisting of:

a surpassing of the converting power threshold value by the converting power of the catalyst, an expiration of a second time interval since the second set of measures has been started, and a surpassing of a second load integral threshold value by a load integral integrated since the second set of measures has been started.

4. The method of claim 3, wherein a diagnostic function for checking a functionality of the catalyst is started as a result of the occurrence of an event selected from the group of events consisting of:

the expiration of the second time interval since the second set of measures has been started, and the surpassing of the second load integral threshold value by the load integral integrated since the second set of measures has been started.

5. The method of claim 4, wherein the diagnostic function includes heating the catalyst using a third set of measures if the converting power of the catalyst is below the converting power threshold value and terminating the third set of measures as a result of the occurrence of an event selected from the group of events consisting of:

the surpassing of the converting power threshold value by the converting power of the catalyst, an expiration of a third time interval since the third set of measures has been started, and a surpassing of a third load integral threshold value by a load integral integrated since the third set of measures has been started.

6. The method of claim 5, further comprising the step of indicating that the catalyst is damaged upon the occurrence of an event selected from the group of events consisting of:

the expiration of the third time interval since the third set of measures has been started, and the surpassing of the third load integral threshold value by the load integral integrated since the third set of measures has been started.

7. The method of claim 1, further comprising the step of indicating that the lambda control is defective upon the occurrence of an event selected from the group of events consisting of:

the expiration of the first time interval since the starting of the internal combustion engine, the expiration of the first time interval since the deactivation of the lambda control, the surpassing of the first load integral threshold value by the load integral integrated since the starting of the internal combustion engine, and the surpassing of the first load integral threshold value by the load integral integrated since the deactivation of the lambda control.

8. The method of claim 2, wherein the different measures for heating the catalyst are selected from the group of measures consisting of a retardation of a firing angle of the internal combustion engine, a change of an air/fuel mixture, an injection of secondary air, an increase of an idling speed of the internal combustion engine, an action on a transmission control, and an action on an air feed to the internal combustion engine.

9. The method of claim 2, wherein the at least one value representative of a condition after conversion by the catalyst is produced by an oxygen sensor arranged downstream of the catalyst.

10. The method of claim 2, wherein the at least two values are indicative of an increase in temperature of the catalyst, which increase in temperature is caused by the conversion.

11. The method of claim 2, wherein the at least two values are indicative of an increase in temperature of an exhaust-gas flowing through the exhaust-gas system, which increase in temperature is caused by the conversion.

12. A device for heating a catalyst in an exhaust gas system of an internal combustion engine, the device comprising:

at least two sensors for measuring at least two values, with at least one value representative of a condition before conversion by the catalyst and at least one value representative of a condition after conversion by the catalyst;

means for determining a converting power of the catalyst from the at least two values; and means for heating the catalyst as a function of the converting power of the catalyst;

wherein the means for heating the catalyst performs different sets of measures for heating the catalyst depending on at least one operating condition of the internal combustion engine.

* * * * *